United States Patent

Vollersen et al.

[11] Patent Number: 5,074,187
[45] Date of Patent: Dec. 24, 1991

[54] ROCKET NOZZLE SHIELD

[75] Inventors: Carl A. Vollersen, Saratoga; Thomas W. Anderson; Wayne M. Brown, both of San Jose; Lozelle L. Pratt, Mountain View, all of Calif.

[73] Assignee: The United States of America as represented by the Secretary of the Navy, Washington, D.C.

[21] Appl. No.: 674,271

[22] Filed: Mar. 8, 1991

[51] Int. Cl.$^5$ ............................................. F41F 3/07
[52] U.S. Cl. ............................................... 89/1.809
[58] Field of Search ............... 89/1.809, 1.810, 1.806, 89/1.807, 1.812, 1.818

[56] References Cited

U.S. PATENT DOCUMENTS

| | | | |
|---|---|---|---|
| 2,690,124 | 9/1954 | Melick | 89/1.806 |
| 3,090,197 | 5/1963 | Lapp et al. | 89/1.812 |
| 3,166,977 | 1/1965 | Pickett et al. | 89/1.809 |
| 3,166,979 | 1/1965 | Draim | 89/1.809 |
| 3,180,225 | 4/1965 | Draim | 89/1.809 |
| 3,398,639 | 8/1968 | Apotheloz | 89/1.806 |
| 3,754,726 | 8/1973 | Rusbach | 89/1.806 |
| 3,811,360 | 5/1974 | Ricks | 89/1.807 |
| 4,185,538 | 1/1980 | Barakauskas | 89/1.810 |
| 4,550,640 | 11/1985 | Harter | 89/1.806 |
| 4,796,510 | 1/1989 | Piesik | 89/1.809 |
| 4,949,618 | 0/1990 | Tarlano | 89/1.81 |

Primary Examiner—David H. Brown
Attorney, Agent, or Firm—Kenneth L. Warsh; Robert Wohlfarth

[57] ABSTRACT

A shield for the nozzle of the nozzle of a missile launched from beneath the water, can be formed of a rigid plate spaced from the aft end of the nozzle to form a gap of area at least equal to the throat area of the nozzle. The gap reduces overpressure of the missile during launch while keeping water out of the nozzle by being directed perpendicular to the water flow direction.

3 Claims, 3 Drawing Sheets

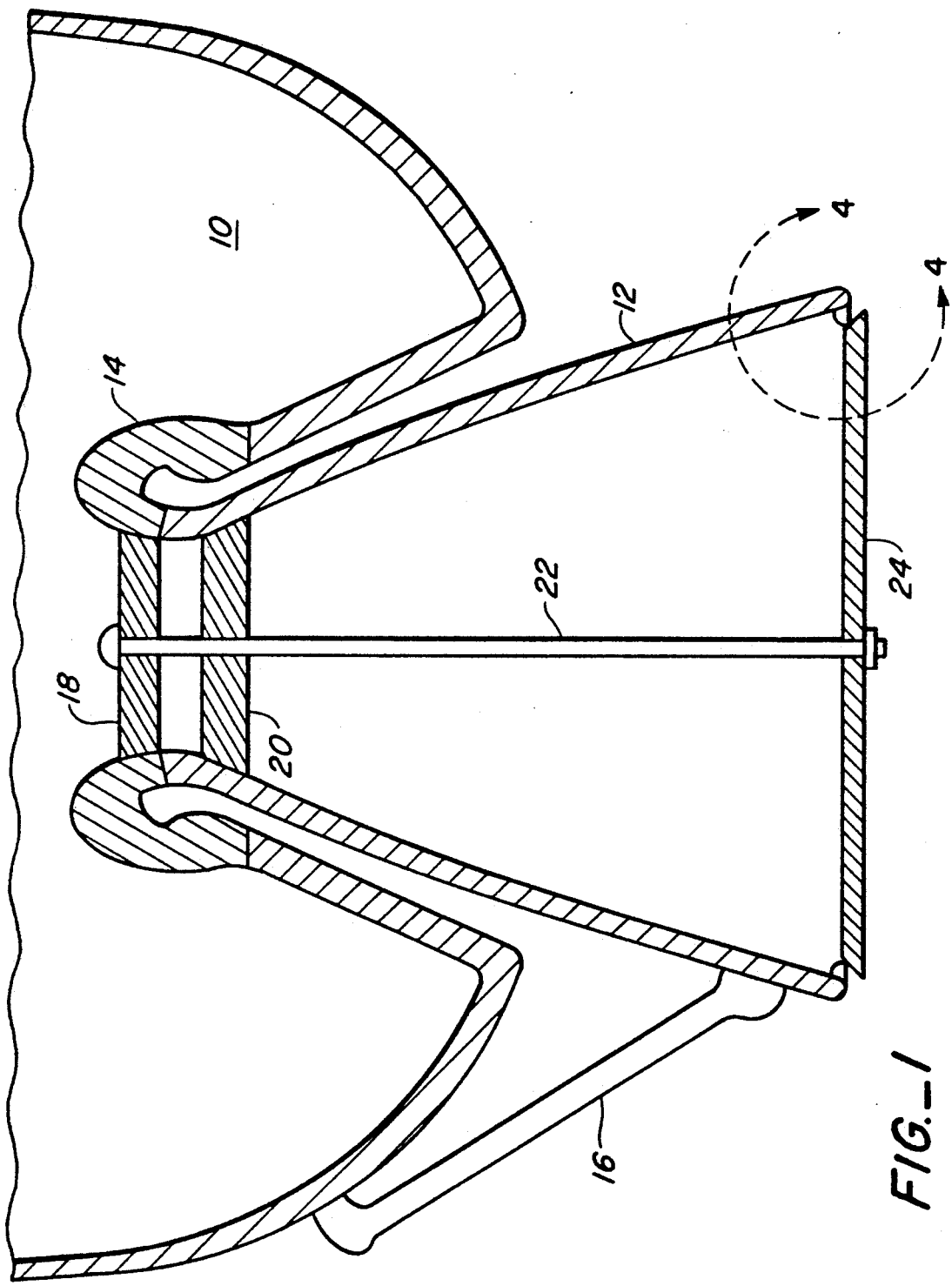
FIG._1

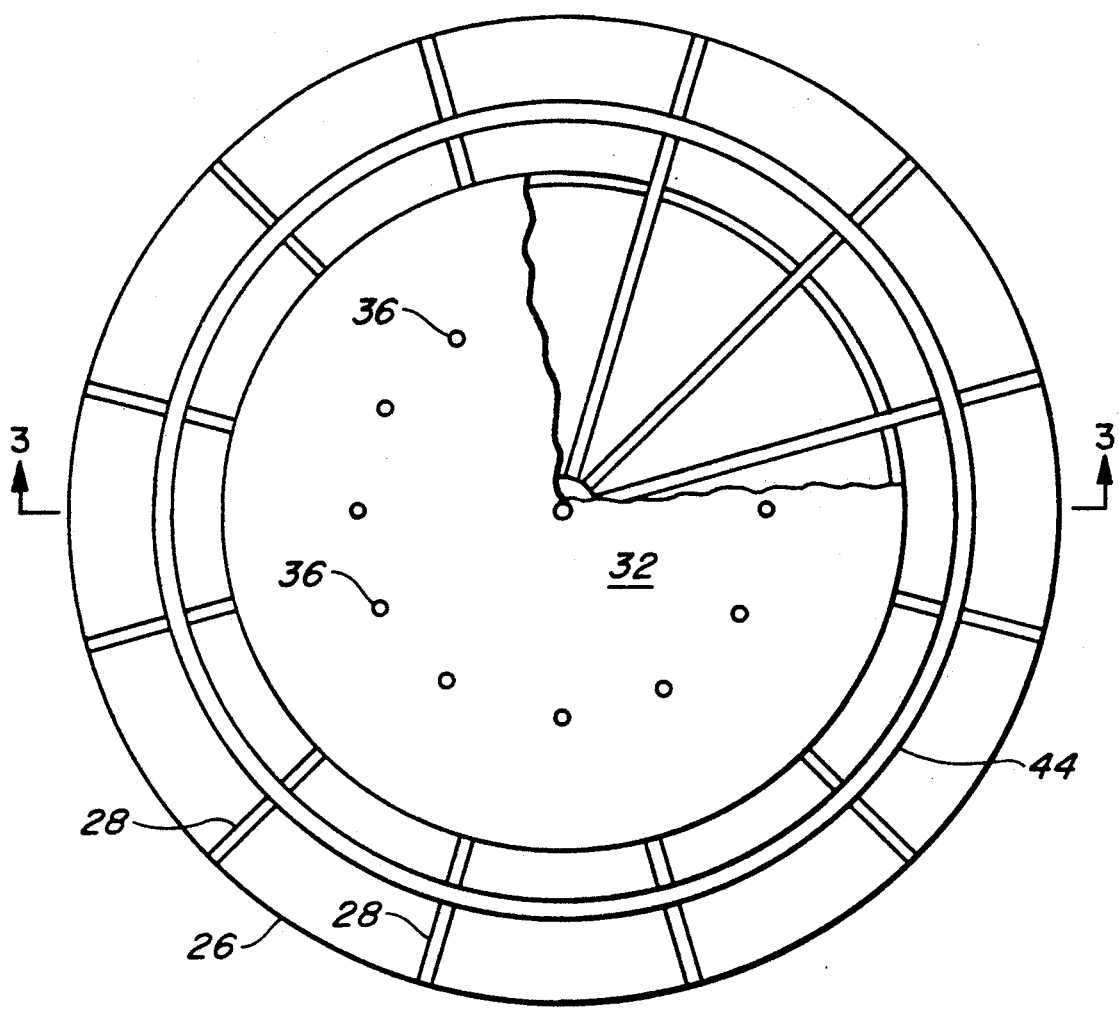
FIG._2
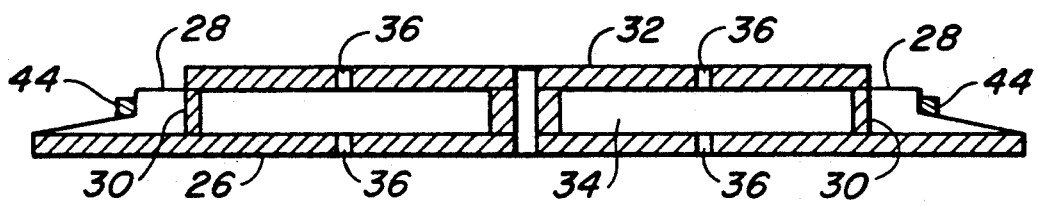
FIG._3

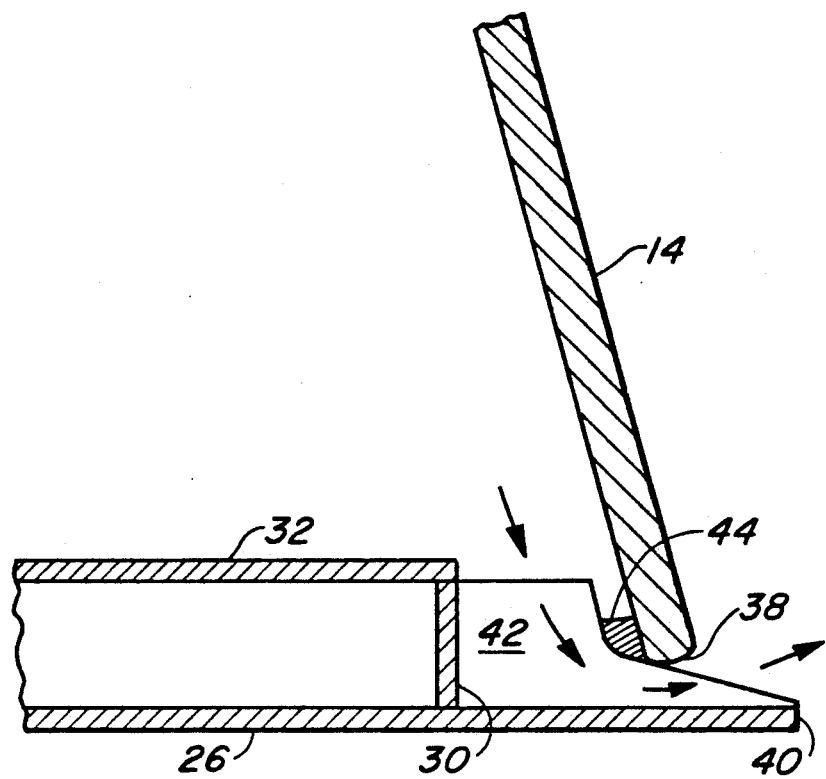
FIG._4

ROCKET NOZZLE SHIELD

FIELD OF THE INVENTION

This invention pertains to a method and apparatus for protecting the nozzle of a rocket launched from beneath the water from damage by a water jet.

BACKGROUND OF THE INVENTION

Rockets launched from beneath the water displace water as the rocket passes upward. Since the rocket is slowing as it rises, the water, which surges into the space behind the passing rocket can achieve a speed greater than the upward moving rocket and strike the rocket nozzle with a jet as the rocket leaves the water. This jet can interact with the rocket exhaust at ignition and damage the nozzle, the nozzle mounts, or nozzle motion actuators.

The launch environment uses a gas pressure considerably above atmospheric pressure to thrust the rocket through the water toward the surface. A gas tight seal over the nozzle such as shown in U.S. Pat. No. 4,949,618 prevents the launch gases from equalizing pressure inside the rocket and endangers the integrity of the rocket. Any protection system must permit the flow of gas while protecting the rocket against a water jet.

OBJECTIVES OF THE INVENTION

It is therefore a primary objective of the present invention to devise a rocket nozzle shield which is substantial enough to protect the rocket against an overtaking water jet.

It is a further objective to devise a rocket nozzle shield which will prevent gas pressure from damaging the missile.

SUMMARY OF THE INVENTION

These objects of the invention and other objects, features and advantages to become apparent as the specification progresses are accomplished by the invention according to which, briefly stated, a solid plate is fixed behind the rocket nozzle at a distance from the rim of the rocket nozzle sufficient to permit flow of gas between the plate and the rim.

LIST OF ADVANTAGES OF THE INVENTION

An important advantage of the present invention is simplicity and small expense.

A further advantage is strength and ability to absorb a blow from a water jet.

Another advantage is the ability to block the flow of water from behind the rocket without blocking the flow of gas.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

BRIEF DESCRIPTION OF THE DRAWINGS

FIG. 1 shows a schematic cross-section of the aft end of a rocket showing the position of the shield according to the invention.

FIG. 2 shows a top view of a preferred embodiment of the shield according to the invention with partial cutaway of the top plate to show the ribs.

FIG. 3 is a cross-sectional view of the embodiment of FIG. 2 along the section line 3—3 of FIG. 2.

FIG. 4 is a detail of the area marked 4 in FIG. 1 to show the vent area at the edge of the shield of FIG. 2.

GLOSSARY

The following is a glossary of elements and structural members as referenced and employed in the present invention.

10—first stage fuel tank and combustion chamber
12—nozzle
14—nozzle mount
16—nozzle motion actuator
18—fore nozzle throat baffle
20—aft nozzle throat baffle
22—link
24—shield
26—main plate of the shield
28—radial ribs attached to the main plate
30—inner rim attached to the main plate
32—top plate
34—compartment
36—vent holes
38—aft end of nozzle 14
40—outer rim of main plate 26
42—gap between rim 40 of plate 26 and aft end 38 of nozzle 14
44—adapter ring

DESCRIPTION OF THE PREFERRED EMBODIMENTS

Referring now to the drawings wherein like reference numerals are used to designate like or corresponding parts throughout the various figures thereof, there is shown in FIG. 1 a schematic cross-section of the aft end of a rocket showing the position of the shield according to the invention. The principal parts of the aft end of the rocket includes the first stage fuel tank and combustion chamber 10, nozzle 12, nozzle mount 14, nozzle motion actuator 16, nozzle throat baffles 18, 20, and link 22, which supports the shield 24. The nozzle mount 14 provides a flexible but gas-tight seal between the first stage fuel tank and combustion chamber 10 and the nozzle 12. The nozzle actuator 16 moves the nozzle 12 relative to the fuel tank 10 to steer the rocket. There are two actuators, only one of which is shown for clarity, mounted to provide motion in orthogonal planes. The throat baffles 18, 20 are made of a porous material such as sintered beads of aluminum. The baffles 18, 20 blow out at ignition of the first stage engine, thereby removing the support for the shield 24 through the link 22. Baffles 18, 20, link 22, and shield 24 then fall into the sea.

The shield 24 according to the invention can be made of aluminum, fiberglass or other synthetic material strong enough to survive the launch environment and a blow from a jet of water. In a preferred embodiment shown in FIGS. 2 and 3, a main plate 26 of aluminum, has radial ribs 28, and a circular inner rim 30 integrally machined to provide a rigid but lightweight disk. A smaller top plate 32 is fastened to the ribs 28 and inner rim 30 to form a compartment 34. A plurality of small vent holes 36 in the main plate 26 and top plate 32 leak water into the compartment 34 after it falls into the sea. The purpose of the compartment 34 is to prevent the shield from sinking before the launch platform has left the area. The vent holes 36 allow the compartment 34 to fill slowly and sink rather than remaining on the surface as dangerous jetsam.

An important part of the invention is to form a gap 42, as shown in FIG. 4, between the aft end 38 of the nozzle 12 and outer rim 40 of the plate 26. The missile is forced out of the launch platform by high pressure gas. This gas passes through the gap 42 and fills the nozzle 12, then through the fore and aft throat baffles 18, 20 to fill the combustion chamber 10 to permit internal pressure to come into equilibrium with the pressure in the launch platform. As the missile rises, the gas flow reverses from the combustion chamber 10, through the baffles 18, 20, through the nozzle 12, and through the gap 42. The outflowing gas minimizes aftward acting pressure forces on the shield and keeps water from entering by being directed perpendicular to the water flow. The area of the gap should be at least the area of the throat of the nozzle to prevent dangerous overpressure which might threaten structural integrity.

In order to space the rim 40 from the aft end 38 of the nozzle 12, and adapter ring 44 is fastened to the ribs 28. The outer diameter of the adapter ring 44 is such that the shield 24 sits snugly on the nozzle 12. The shield 24 is held in place by tension in the link 22 which is fastened through the fore and aft throat baffles 18, 20. The inner diameter of the adapter ring 44 is rounded as shown in FIG. 4 to reduce resistance to the outflow of the gas. The throat baffles 18, 20 are sufficiently flexible that at moments of peak overpressure inside the nozzle 12 the gap 42 is opened to a size larger than the dimension at rest, thereby reducing the overpressure. The breaking strength of the link 22 is chosen so that the link will break before the shield can tear out the throat baffles 18, 20.

In a preferred embodiment a shield of 52 inches diameter was machined to a plate thickness of about 0.10 inches and rib thickness of about 0.25 inches.

This invention is not limited to the preferred embodiment and alternatives heretofore described, to which variations and improvements may be made, without departing from the scope of protection of the present patent and true spirit of the invention, the characteristics of which are summarized in the following claims.

We claim:

1. A shield for the aft end of the nozzle of a missile launched from beneath the water, said nozzle having a throat and an aft end, said shield comprising:
a main plate approximately the size of the aft end of the nozzle, said plate being reinforced with ribs,
a mounting ring attached to said ribs providing means for spacing said plate from said nozzle to form a gap which is at least as large in area as the throat of the nozzle, and
means for attaching said main plate to the nozzle.

2. The shield of claim 1 including an inner rim attached to said ribs and said plate, a top plate attached to said inner rim and said ribs, said rim, said top plate, and said main plate forming a chamber providing means for flotation of said shield, a plurality of small vent holes in said main plate and said top plate placed to make said chamber leak water slowly.

3. The shield of claim 1 wherein said mounting ring has a rounded corner.

* * * * *